UNITED STATES PATENT OFFICE.

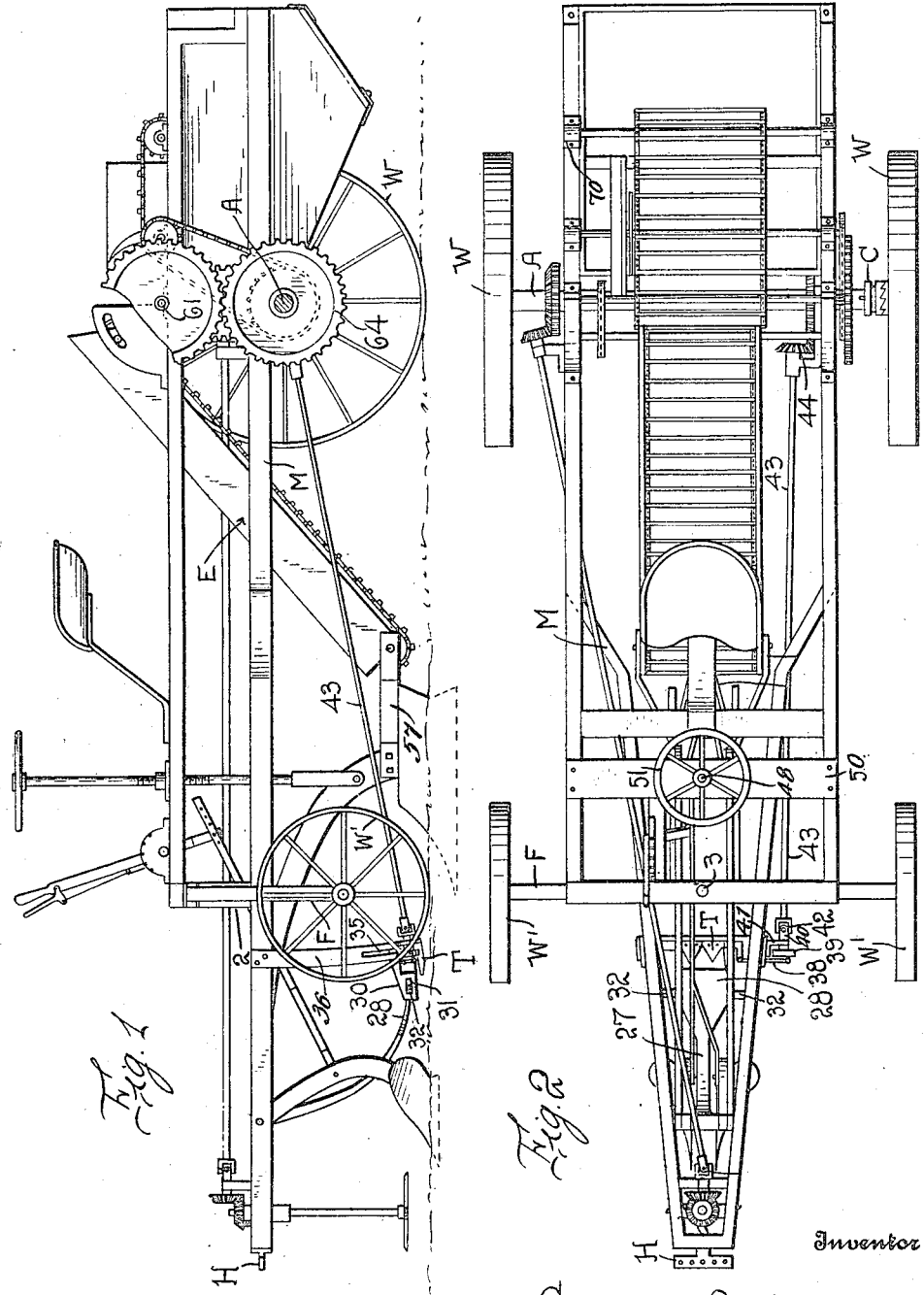

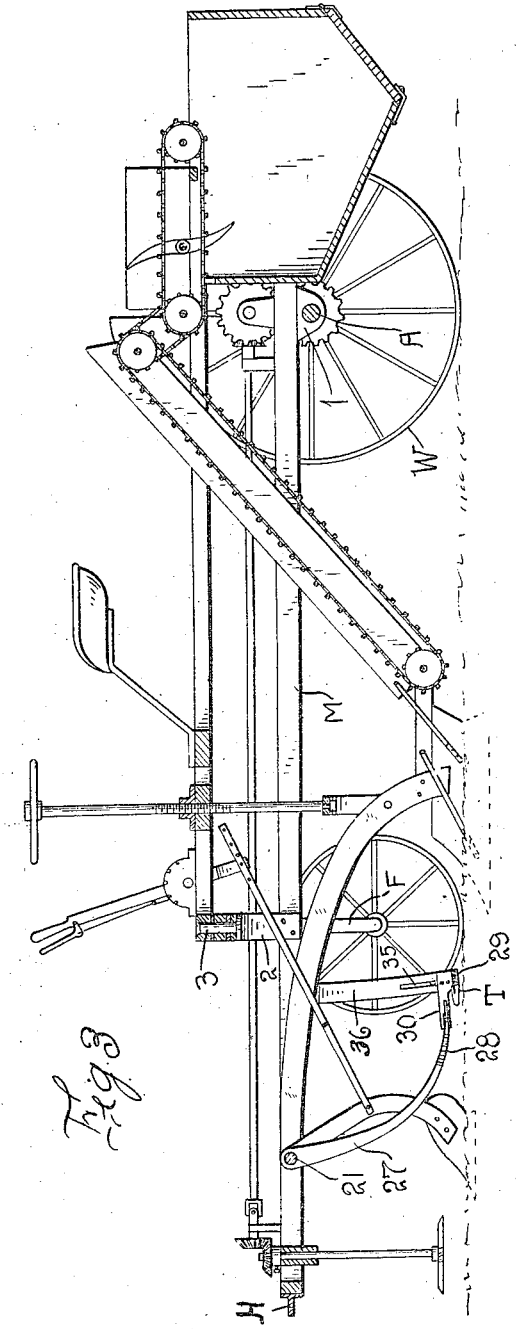

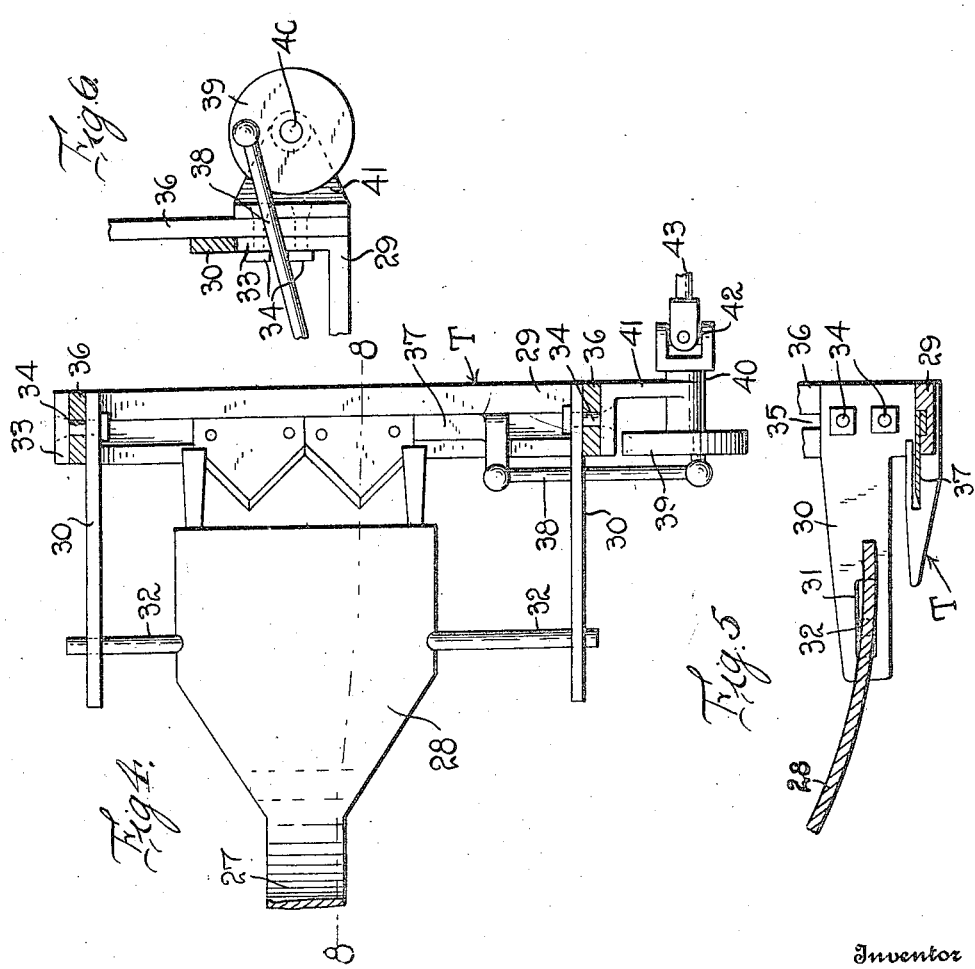

CLARENCE O. WAYMAN, OF LOGAN, UTAH.

BEET-HARVESTER.

1,259,178.  Specification of Letters Patent.  Patented Mar. 12, 1918.

Application filed November 27, 1916. Serial No. 133,700.

*To all whom it may concern:*

Be it known that I, CLARENCE O. WAYMAN, a citizen of the United States, residing at Logan, in the county of Cache and State of Utah, have invented certain new and useful Improvements in Beet-Harvesters, of which the following is a specification, reference being had to the accompanying drawings.

This invention relates to certain improvements in beet harvesters and it is an object of the invention to provide a device of this general character having novel and improved means whereby the beets are topped before being lifted and wherein the lifting members are provided with means to permit sifting of the dirt from the beets after the same have been drawn from the soil.

Furthermore an object of the invention is to provide a device of this general character including a novel and improved topping mechanism wherein said topping mechanism is adjusted vertically in an automatic manner so that said topping mechanism will have the requisite coaction with the beets to be topped.

The invention consists in the details of construction and in the combination and arrangement of the several parts of my improved beet harvester whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in side elevation of a beet harvester constructed in accordance with an embodiment of my invention;

Fig. 2 is a view in top plan of the device as herein disclosed;

Fig. 3 is a longitudinal vertical sectional view taken through my invention as herein embodied and at substantially the transverse center thereof;

Fig. 4 is an enlarged fragmentary view partly in top plan and partly in section of the topping mechanism as herein included;

Fig. 5 is a sectional view taken substantially on the line 8—8 of Fig. 4;

Fig. 6 is a fragmentary view partly in front elevation and partly in section illustrating the operating means for the topping mechanism as herein disclosed.

As disclosed in the accompanying drawings, M denotes the main frame of my improved harvester as herein embodied having its rear portion operatively connected, as at 1, with the rear or driving axle A. Freely rotatable upon the extremities of the axle A are the wheels W, and coacting with one of said wheels W is the clutch member C which serves to cause the axle A to rotate in unison with said wheel upon the forward travel of the device, and whereby both of said wheels W rotate independently of the axle A upon rearward movement of the machine. It will also be understood that upon imparting the requisite endwise movement to one of the members comprised in the clutch C, the axle A will remain stationary during the forward travel of my improved harvester. I have not shown any particular means for controlling the operation of the clutch C, as this in itself forms no particular part of my present invention, and it will therefore be understood that any means may be used which can be employed with convenience and facility in connection with said clutch.

At a predetermined point of its forward end the main frame M has secured thereto the upstanding yoke 2 substantially in the form of an inverted U to the base portion of which is pivotally engaged, as at 3, the forward axle F upon the extremities of which the wheels W' are mounted. As herein embodied, the axle F and the wheels W' serve in the nature of a caster although it is to be understood that if desired I can employ any suitable means coacting with the axle F for positively steering the machine.

The forward end of the main frame M is provided with a suitable hitch H whereby draft animals or other pulling means may be readily and conveniently engaged with my improved harvester.

Pivotally engaged with the bar or stationary shaft 21 is the upper end of the downwardly and rearwardly curved shank 27 of the shoe 28. The shoe 28 is also arranged on a suitable curvature longitudinally of the machine and has its rear end portion terminating above and in close proximity to the topping mechanism T. The shoe 28 is adapted to contact with and ride over the roots of the beets which may be extending above the ground in order that the topping mechanism T may properly coact therewith.

The topping mechanism T as herein disclosed is of a conventional type wherein a reciprocating sickle is employed. As herein disclosed, the cutting bar 29 is provided adjacent its opposite ends with the forwardly directed arms 30 provided in their forward or free end portions with the longitudinally disposed slots 31 through which are freely directed the laterally extending fingers 32 carried by the opposite side portions of the shoe 28. The cutting bar 29 adjacent its opposite ends is also provided with the upstanding portions 33 provided with the inwardly directed members 34 directed through the longitudinally disposed slot 35 produced in the lower end portions of the arms 36 depending from the frame M. As herein embodied, the members 34 comprise conventional coacting headed bolts and nuts which also afford a medium for holding one of the arms 30 in assembled relation. The second arm 30 is held to its coacting upstanding portion 33 of the cutting bar 29 in any desired manner. In view of the foregoing it is thought to be self-evident that as the shoe 28 rises or lowers the cutting mechanism T will be caused to move therewith and in the same general direction.

Coacting with the bar 29 is the reciprocating sickle 37 of conventional type which has operatively engaged therewith the pitman 38 also operatively engaged with the driving disk 39 carried by the shaft 40 rotatably supported by the bracket 41 held in assembled relation by certain of the inwardly directed members 34. The shaft 40 is disposed longitudinally of the machine and has operatively engaged with its inner or rear end through the medium of the universal joint 42, a shaft 43 extending longitudinally of the machine and operatively engaged, as at 44, with the axle A. It is to be noted that the slots 35 hereinbefore referred to are arcuate in form and disposed in a circular path substantially concentric to the axle A.

From the foregoing description, it is thought to be obvious that a beet harvester constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. A beet harvester including a frame, a topping mechanism supported by the frame and capable of vertical movement, said cutting mechanism being provided with a forwardly directed arm, a shoe pivotally engaged with the frame at a point in advance of the topping mechanism and capable of movement in a vertical path, said shoe being provided with a laterally directed finger engageable with the arm of the topping mechanism for raising the topping mechanism upon upward movement being imparted to the shoe.

2. A beet harvester including a frame, arms depending therefrom and provided with slots disposed longitudinally thereof, a topping mechanism positioned between the arms and provided with members disposed through the slots of the arms, a shoe supported by the frame at a point in advance of the topping mechanism and capable of movement in a vertical path, and coacting means carried by the shoe and the topping mechanism for imparting upward movement to the topping mechanism upon upward movement of the shoe.

3. A beet harvester including a frame, arms depending therefrom and provided with slots disposed longitudinally thereof, a topping mechanism positioned between the arms and provided with members disposed through the slots of the arms, a shoe supported by the frame at a point in advance of the topping mechanism and capable of movement in a vertical path, forwardly directed arms carried by the topping mechanism, and oppositely disposed fingers carried by the shoe and coacting with the arms carried by the topping mechanism whereby said topping mechanism is moved upwardly upon upward movement of the shoe.

4. A beet harvester including a frame, a topping mechanism supported by the frame and capable of vertical movement, said cutting mechanism being provided with a forwardly directed arm, said arm being provided with a longitudinally disposed slot, a shoe pivotally engaged with the frame at a point in advance of the topping mechanism and capable of movement in a vertical path, said shoe being provided with a laterally directed finger disposed through the slot of the arm of the topping mechanism for raising the topping mechanism upon upward movement being imparted to the shoe.

In testimony whereof I hereunto affix my signature in the presence of two witnesses.

CLARENCE O. WAYMAN.

Witnesses:
 Roy D. Thatcher,
 T. A. Greenhalgh.